United States Patent [19]

Wendel

[11] 4,073,285
[45] Feb. 14, 1978

[54] FLUID HANDLING SYSTEM

[75] Inventor: I. L. Wendel, St. Petersburg, Fla.
[73] Assignee: James L. Lowe, St. Petersburg, Fla.
[21] Appl. No.: 656,641
[22] Filed: Feb. 9, 1976
[51] Int. Cl.² ............................ F24J 3/02; F22B 5/02
[52] U.S. Cl. ................................. 126/271; 62/238; 122/18
[58] Field of Search ............... 122/17, 18, 412, 441; 126/362, 270; 62/238

[56] References Cited

U.S. PATENT DOCUMENTS

| 1,317,039 | 9/1919 | Schneider | 122/18 |
| 1,366,208 | 1/1921 | Noonan | 122/18 |
| 1,862,630 | 6/1932 | Morrow | 122/18 |
| 2,366,507 | 1/1945 | Ford | 122/18 |
| 3,513,663 | 5/1970 | Martin, Jr. et al. | 62/238 |
| 3,922,876 | 12/1975 | Wethering, Jr. et al. | 62/238 |

Primary Examiner—Kenneth W. Sprague
Attorney, Agent, or Firm—William E. Mouzavires

[57] ABSTRACT

A typical automatic hot water tank installation has a self-contained source of heat for the water and is provided with external hot water from a solar collector, air conditioning condenser, or other suitable source. An external hot water handling assembly replaces the conventional drain valve at the bottom of the tank and includes a pair of concentric tubes. The outer one of the tubes is connected through the tank drain connection and has its open end proximate the tank wall. The inner tube extends into the tank inwardly from the outer tube and its opening is approximately midway across the tank and is directly upwardly to provide an inlet for discharge of the external hot water upwardly into a lower portion of the tank, and away from the cold water leaving the tank through the outer tube. Spacing apart of the hot water inlet and cold water outlet substantially retards passage of the hot water directly to the cold water proximate the outlet. Outer connections of the nested tubes are sealed from each other, the outer tube being connected through a pump for circulating the cold water to the external heating source and for circulating hot water from this source through the inner tube and into the hot water tank. The outer tube is preferably provided with a drain, to replace the conventional drain which was removed from the tank prior to installing the nested tube assembly.

8 Claims, 1 Drawing Figure

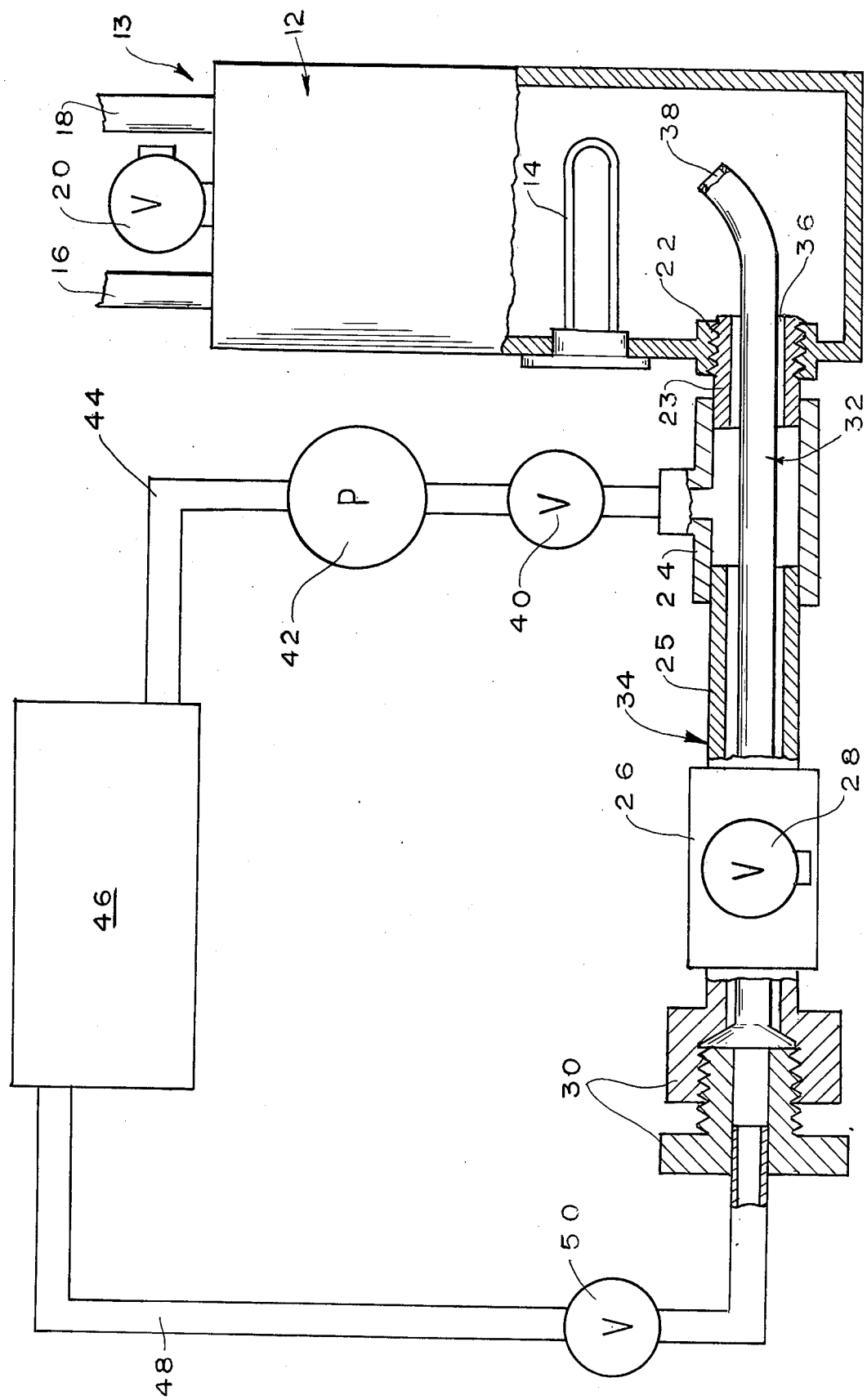

FLUID HANDLING SYSTEM

This invention relates to a hot water installation and to a fluid handling assembly and, more particularly, to an installation and assembly for circulating cold water from a tank to an external heating source and circulating hot water from the source to the tank.

BACKGROUND OF THE INVENTION

Typical automatic water heater tanks are normally provided with cold and hot water connections and a relief valve connection at the top of the tank, a drain valve connection at the bottom of the tank, and an integral source of heat for heating the water. When it is desired to provide an external source of hot water for the tank, a T-fitting may be inserted between the drain connection and the drain valve for withdrawing relatively cold water from the bottom of the tank and this cold water passes to an external source of heat and the heated water from the external source moves back to the tank. A T-fitting may be provided between the relief valve connection in the tank and the relief valve for passage of the external hot water into the tank. However, in such an installation the relief valve may be actuated by the temperature of the external hot water while the overall temperature of the water in the tank is far below the temperature at which the valve is actuated.

This invention, in brief, is directed to a hot water installation and a fluid handling assembly comprising a pair of nested tubes spaced apart for receiving a fluid therebetween. Adjacent open portions of the tubes provide for fluid flow within a tank, or the like, and second open portions of the tubes are sealed from each other to provide separate flow paths for the fluid outside the tank. In one embodiment, the outer tube is connected into a water tank and provides an outlet for relatively cold water in the tank, and the inner tube extends from this outlet farther into the tank and provides an inlet for hot water into the tank, the arrangement being such as to effectively retard the hot water from mixing with the cold water entering the inlet. Outside the tank the outer or cold water tube is connected through a pump for circulating the cold water through a source of heat such as a solar collector, an air conditioning condenser, or similar heat generating equipment, and circulating the resultant hot water from the source through the inner tube and into the tank. In a typical water heater tank, the outer tube is preferably connected into the existing drain connection and is provided with a drain valve for draining the tank. By introducing the external supply of hot water into a lower portion of the tank, premature operation of the typical relief valve in an upper portion of the tank is effectively prevented since the external hot water mixes with cooler water in the tank and is not immediately exposed to the relief valve as would occur if the external hot water is introduced directly into the top of the tank.

Numerous patents shows nested tubes in fluid handling assemblies, for example as show in U.S. Pat. Nos. 638,195, 1,143,196 and 3,267,993, but in all of these patents fluid passing through the nested tubes is moving in the same direction through each of the tubes. A patent showing nested tubes in which fluid flows in opposite directions through the tubes is U.S. Pat. No. 2,224,403, but this patent is not particularly concerned with fluid at different temperatures, and closely proximate openings of the nested inlet and outlet tubes is of no particular consequence. A patent of passing interest for a showing of using transformer cooling water for supplying hot water to a residence is shown in U.S. Pat. No. 3,212,563, and simply suggests another source of external hot water which could be used in conjunction with the fluid handling assembly of this invention.

It is an object of this invention to provide a new and useful hot water installation including a container such as a hot water tank having a pair of nested tubes transversely spaced apart for receipt of water therebetween, an outer one of the tubes being connected into the tank, and the tubes having first open portions opening into the tank and second open portions sealed from each other outside the tank. A related object is provision of such an installation in a tank having a drain connection for receiving a drain in a normal installation of the tank, and the outer tube being connected into the drain connection. Another related object is provision of one of these tubes having a third open portion independent of its first and second open portions, and the third open portion communicating with a drain for the tank. Another related object provision of the first open portions of the tubes (within the tank) being longitudinally spaced from each other, the first open portion of the outer tube being proximate the drain connection of the tank and the first open portion of the inner tube opening into the tank inwardly of the drain connection.

Another object is provision of a fluid handling assembly including a pair of nested tubes, the tubes being transversely spaced apart for receipt of a fluid therebetween, each of the tubes having first and second open portions, the first open portions being longitudinally spaced from each other. A related object is provision of one of the tubes having a third open portion independent of its first and second open portions.

Still another object is to provide a new and useful fluid handling assembly. A related object is provision of such an assembly having inner and outer tubes, one of the tubes providing an inlet for fluid and the other of the tubes providing an outlet for the fluid. Still another related object is provision of such an assembly for replacing a typical drain valve of a container such as a water tank by connecting the outer tube into the tank drain connection and providing the outer tube with a drain valve, with ends of the tubes outside the tank being sealed from each other to provide separate paths for water leaving the tank and for water entering the tank. Still another related object is the provision for the outer tube receiving relatively cold water from the tank and connected for circulating the cold water through an external source of heat for heating the water, the heated water being returned through the inner tube into a lower portion of the tank.

These and other objects and advantages of the invention will be apparent from the following description and accompanying drawing.

BRIEF DESCRIPTION OF THE DRAWING

The drawing is a schematic elevational view of a preferred embodiment of the invention, with parts broken away and removed for clearer illustration.

DESCRIPTION OF THE ILLUSTRATED EMBODIMENT

Referring to the drawing, a suitable container such as a tank 12 of a typical automatic water heater 13 is heated by an integral source of heat, such as an electric heating element 14 for heating cold water entering the tank through an inlet 16, with the heated water being discharged from the tank through an outlet 18. The inlet and outlet are normally connected through a top portion of the tank which also carries a suitable relief valve 20. In order to more clearly illustrate the invention, typical jacketing and insulation about the tank 12 is omitted, as is the typical thermostatic control and source of power for the heating element 14. Any suitable source of heat, such as a gas or oil burner may be provided in lieu of the electric heating element 14.

As mentioned previously, when it is desired to provide the tank with an external source of hot water, a T-fitting is normally inserted between the tank and the relief valve 20 and is connected with the external hot water supply, and another T-fitting is connected between the tank drain connection 22 and the typical drain valve so that the cold water passes from the tank via the drain connection 22 and is pumped to the external source of heat, such as a solar collector, air conditioning condenser, or the like, and the resultant hot water passes to the tank through the T-fitting at the relief valve. Obviously, suitable valving is provided in the external hot water system, and suitable thermostatic control is also preferably provided. A difficulty with a system of this type is that the external hot water entering proximate the relief valve 20 may cause the valve to be actuated when the overall temperature of the hot water in the tank 12 is far below the actuation temperature of the valve.

The present invention overcomes this difficulty while using an existing connection into the tank 12 and, more particularly, only the drain connection 22. The drain connection 22 is connected through a nipple 23 with a T-fitting 24 which is connected in line through a second nipple 25 with a second T-fitting 26, the leg of the fitting 26 being connected with a suitable drain valve 28 so that the tank 12 may be drained through its normal drain connection 22. Connected in line with the two T-fittings 24 and 26 is a tube connector 30 in which is mounted a tube 32 extending through the two T-fittings 24 and 26, the nipples 23 and 25, and tank drain connection 22 within the tank 12. The two T-fittings 24 and 26 and the nipples 23 and 25 define an outer tube 34 which is connected with the tank drain connector 22 and has an open inner portion or cold water inlet 36 opening into the tank 12 proximate the tank side wall and the drain connector 22. Tube 32 is an inner tube which is transversely spaced from the interior of the outer tube 34, the end of the inner tube 32 within the tank extending longitudinally from the inlet 36 of the outer tube 34 to an open portion or hot water inlet 38 spaced longitudinally inwardly of the outer tube 34 to a position substantially transversely centered in the tank 14 and being directed slightly upwardly, as shown.

The leg of T-fitting 24 is connected through a suitable shut-off valve 40 with the inlet of a pump 42 which has its outlet connected through a tube 44 with an external source of heat 46 such as a solar collector, an air conditioning condenser, or the like. From the external source of heat 46 the pump 42 forces the hot water through a tube 48 having a suitable shut-off valve 50 in communication with the inner tube 32 which opens into the tank 12. Pump 42 is suitably controlled (not shown) to turn on when cold water in the tank 12 is below a predetermined temperature and when the water temperature in the external source of heat 46 is above a minimum temperature.

While this invention has been described and illustrated with reference to a particular embodiment in a particular environment, various changes may be apparent to one skilled in the art and the invention is therefore not to be limited to such embodiment or environment, except as set forth in the appended claims.

What is claimed is:

1. A fluid handling installation comprising, a container for fluid, said container having an upper portion for normally containing relatively hot fluid and having a lower portion for normally containing relatively cold fluid, and said container having a connection opening therethrough, an integral fitting for connection with the container, said fitting having a pair of nested tubes transversely spaced apart for receipt of fluid therebetween, an outer one of said tubes being connected with said connection, and said tubes having first open portions opening within the same said portion of said container and said tubes further having second open portions sealed from each other and connected in circuit with a source of relatively hot fluid for delivery to said container and for receiving the relatively cold fluid from said container, the first open portion of said inner tube being spaced longitudinally outwardly from and opening in a direction away from the first open portion of said outer tube to retard direct intermixing of fluid passing through said first open portions, and the second open portion of said outer tube being between the open portions of said inner tube.

2. An installation as set forth in claim 1 in which said container is a tank and said connection is a normal drain connection of the tank, and said outer tube has a third open portion communicating with normally closed drain means for said tank.

3. An installation as set forth in claim 1 in which said container is a hot water tank, said first open portion of said inner tube is a hot water inlet into said tank, said first open portion of said outer tube is a cold water outlet from said tank, and said second open portions of said outer tube and said inner tube communicate, respectively, with an inlet and an outlet of said source.

4. An installation as set forth in claim 3 in which said tank is part of an automatic water heater including heating means for the water, said source is an auxiliary source of heat for the water, and said fitting opens into said lower portion of said tank so that hot water entering said tank through said fitting mixes with the cold water in said lower portion of said tank before mixing with the hot water in said upper portion of said tank.

5. An installation as set forth in claim 4 in which said tank has a relief valve opening into said upper portion so that the hot water entering the tank through said inner tube and mixing with the cold water in the lower portion of the tank prevents the hot water in the upper portion of the tank from becomming abnormally over heated, thereby effectively preventing premature actuation of said relief valve.

6. An installation as set forth in claim 5 in which in normal installation of said tank said connection is a drain connection in a lower portion of the tank and said outer tube has a third open portion communicating with drain means for said tank.

7. An installation as set forth in claim 6 in which said source of hot water is a solar collector.

8. An installation as set forth in claim 6 in which said source of hot water is a condenser of an air conditioning unit.

* * * * *